(12) United States Patent
Missell et al.

(10) Patent No.: US 6,909,578 B1
(45) Date of Patent: Jun. 21, 2005

(54) METHOD AND SYSTEM FOR REDUCING THERMAL POLE TIP PROTRUSION

(75) Inventors: Frank P. Missell, San Diego, CA (US); David J. Seagle, Morgan Hill, CA (US); Sandrawattie Sankar, San Diego, CA (US); Kenneth F. Young, San Jose, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 278 days.

(21) Appl. No.: 10/159,529

(22) Filed: May 30, 2002

(51) Int. Cl.[7] .................................................. G11B 7/12
(52) U.S. Cl. ...................................................... 360/126
(58) Field of Search ................................. 360/126, 319

(56) References Cited

U.S. PATENT DOCUMENTS

2003/0128469 A1 * 7/2003 Pust et al. ............... 360/234.5

* cited by examiner

Primary Examiner—A. J. Heinz
Assistant Examiner—Mark Blouin
(74) Attorney, Agent, or Firm—Joshua C. Harrison, Esq.; Sawyer Law Group LLP (57) ABSTRACT

A method and system for providing head is disclosed. The method and system include providing a first pole, a second pole, a write gap, at least one coil and an $Fe_3Pt$ alloy. The write gap separates the first pole from the second pole. The first and second poles are for writing to a medium. The coil(s) have a plurality of turns and reside between the roles. The $Fe_3Pt$ alloy is in proximity to the first pole and the second pole. The $Fe_3Pt$ alloy is configured to counteract expansion of the first pole and the second pole.

32 Claims, 6 Drawing Sheets

METHOD AND SYSTEM FOR REDUCING THERMAL POLE TIP PROTRUSION

FIELD OF THE INVENTION

The present invention relates to magnetic recording systems, and more particularly to a method and system for providing a write head having reduced thermal protrusion of the pole tip.

BACKGROUND OF THE INVENTION

Figure 1A:
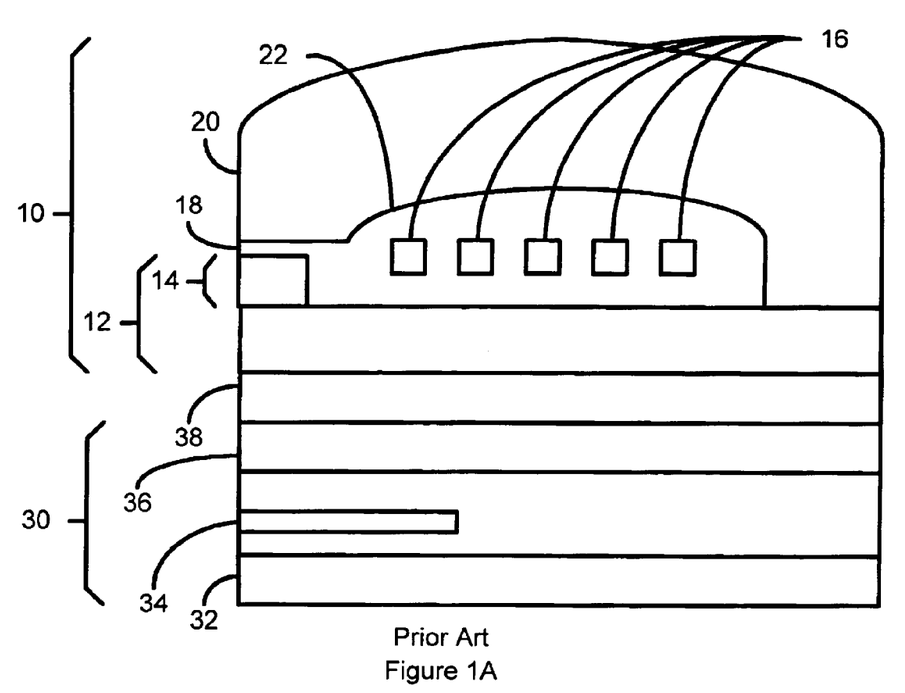
FIG. 1A is a side view of a portion of a conventional merged head including a conventional write head and a conventional read head.
Figure 1B:
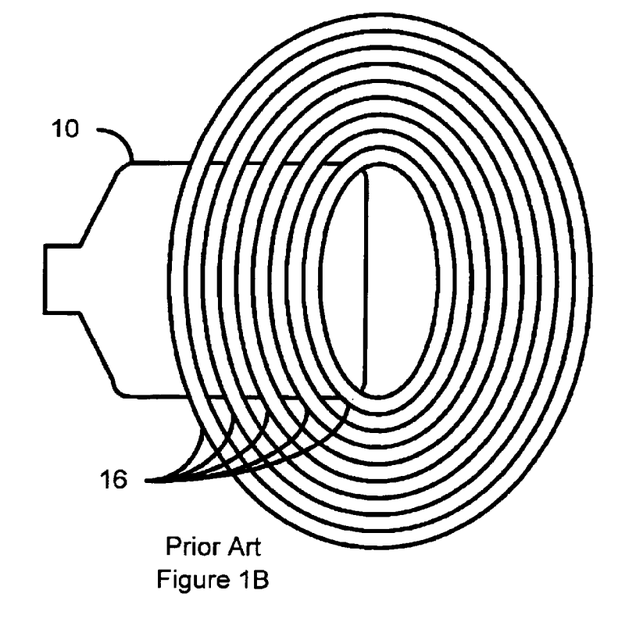
FIG. 1B is a top view of a portion of the conventional write head of FIG. 1A.

In order to write data to media, a write head is typically used. Such a write head is generally part of a merged head that includes a head for writing and a head for reading data from the media. FIGS. 1A and 1B depict a side view and a top view, respectively, of a portion of a merged head including a conventional write head 10 and a conventional read head 30. The conventional write head 10 includes a conventional first pole (P1) 12 and a conventional second pole (P2) 20 that are separated at the front, near the air-bearing surface, by a conventional gap 18. Also shown is the hardbake layer 22 that is typically photoresist that is used to insulate the coils 16 of the conventional write head 10. The conventional P1 12 includes a conventional pedestal 14. The conventional read head 30 includes first shield (S1) 32, read sensor 34 and second shield 36. The conventional P1 12 typically lies above S2 and is separated from S2 by a gap 38.

Although the conventional write head 10 functions, one of ordinary skill in the art will readily recognize that the write head 10 is subject to thermal pole tip protrusion. Pole tip protrusion adversely impacts the reliability of disk drives because a protruding pole is more likely to contact the media during operation. In thermal pole tip protrusion, the top of the P1 12 and/or P2 20 expands upon heating. The shields S1 and S2 may also protrude upon heating. During use, the write head 10 is subject to an ambient temperature rise. In addition, the read sensor (not shown) is typically a magnetoresistive sensor. Current is driven through the sensor during use. In addition, a write current is driven through the coils 16 during use. The current in the read sensor, the write current in the coils and eddy currents in the core of the conventional recording head 10 also cause heating of the conventional write head 10. Different portions of the write head 10 have different coefficients of thermal expansion. Most portions of the conventional write head 10 have a higher coefficient of thermal expansion than the underlying substrate. As a result, different portions of the write head 10 expand different amounts, causing the write head 10 to distort. The P1 12 and P2 20, as well as the hard baked photoresist 22, have large positive coefficients of thermal expansion. As a result, the tips of P1 12 and P2 20 near the air-bearing surface expand and protrude outward. Moreover, the currents in the conventional write head 10 cause greater local heating in the region of the poles, exacerbating the protrusion of the poles P1 12 and P2 20.

In order to address protrusion of the poles, more recently developed recording heads (not shown) use a material having a coefficient of thermal expansion that is less than that of the substrate as part of the conventional recording head. Such materials include $SiO_2$ or FeNi INVAR (an alloy, typically including Ni and Fe and having low thermal expansion coefficient). Thus, the material will expand less than the substrate upon heating. As a result, stress that tends to counteract the thermal expansion is placed on the poles. This should reduce the protrusion of the tips of the poles.

Although the use of $SiO_2$ and FeNi INVAR may reduce protrusion of the pole tips, one of ordinary skill in the art will readily recognize that such materials are difficult to use. $SiO_2$ has a poor thermal conductivity and elasticity. In addition, $SiO_2$ tends to delaminate. As a result, $SiO_2$ is difficult to use in a recording head. Similarly, FeNi INVAR has the desired properties only in a narrow composition range around sixty-five percent Fe. However, this composition coincides with the transition between fcc (face centered cubic) and bcc (body centered cubic) structures for FeNi INVAR. Because the FeNi INVAR having the desired properties is near this phase transition, it becomes difficult to obtain a stable form of FeNi INVAR having the thermal expansion properties. As a result, the reduction of protrusion of the pole tips remains problematic.

Accordingly, what is needed is a system and method for reducing the tendency of the poles of a recording head to protrude. The present invention addresses such a need.

SUMMARY OF THE INVENTION

The present invention provides a method and system for providing a recording head. The method and system comprise providing a first pole, a second pole, a write gap and at least one coil. The write gap magnetically separates the first pole from the second pole at the front of the head. The fringing field across the write gap writes data. The coil(s) have a plurality of turns and reside between the first and second poles. The method and system also include providing $Fe_3Pt$ INVAR (an Fe Pt alloy, generally having an fcc crystal structure) in proximity to the first pole and the second pole. The $Fe_3Pt$ INVAR is configured to counteract expansion of the first and second poles and the insulating material between the first and second poles.

According to the system and method disclosed herein, the present invention provides a recording head which is less subject to thermal pole tip protrusion and thus has improved reliability.

DETAILED DESCRIPTION OF THE INVENTION

The present invention relates to an improvement in recording heads. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a write head. The method and system comprise providing a first pole, a second pole, a write gap and at least one coil. The write gap separates the first pole from the second pole. The first and second poles are used for writing to a medium. The coil(s) have a plurality of turns and reside between the first pole and the second pole. The method and system also include providing $Fe_3Pt$ INVAR (an $Fe_3Pt$ alloy, which generally has an fcc crystal structure) in proximity to the first pole and the second pole. The $Fe_3Pt$ INVAR is configured to counteract expansion of the first pole and the second pole.

The present invention will be described in terms of particular recording head components located in certain areas. However, one of ordinary skill in the art will readily recognize that this method and system will operate effectively for other heads having components in different locations that are consistent with the present invention. The present invention will also be described in the context of a portion of a write head that is part of a merged head including both a recording head and a read head. However, one of ordinary skill in the art will readily recognize that the write head in accordance with the present invention could be separate. The present invention will also be described in the context of methods having particular steps. One of ordinary skill in the art will recognize, however, that for clarity, some steps have been omitted.

Figure 2:
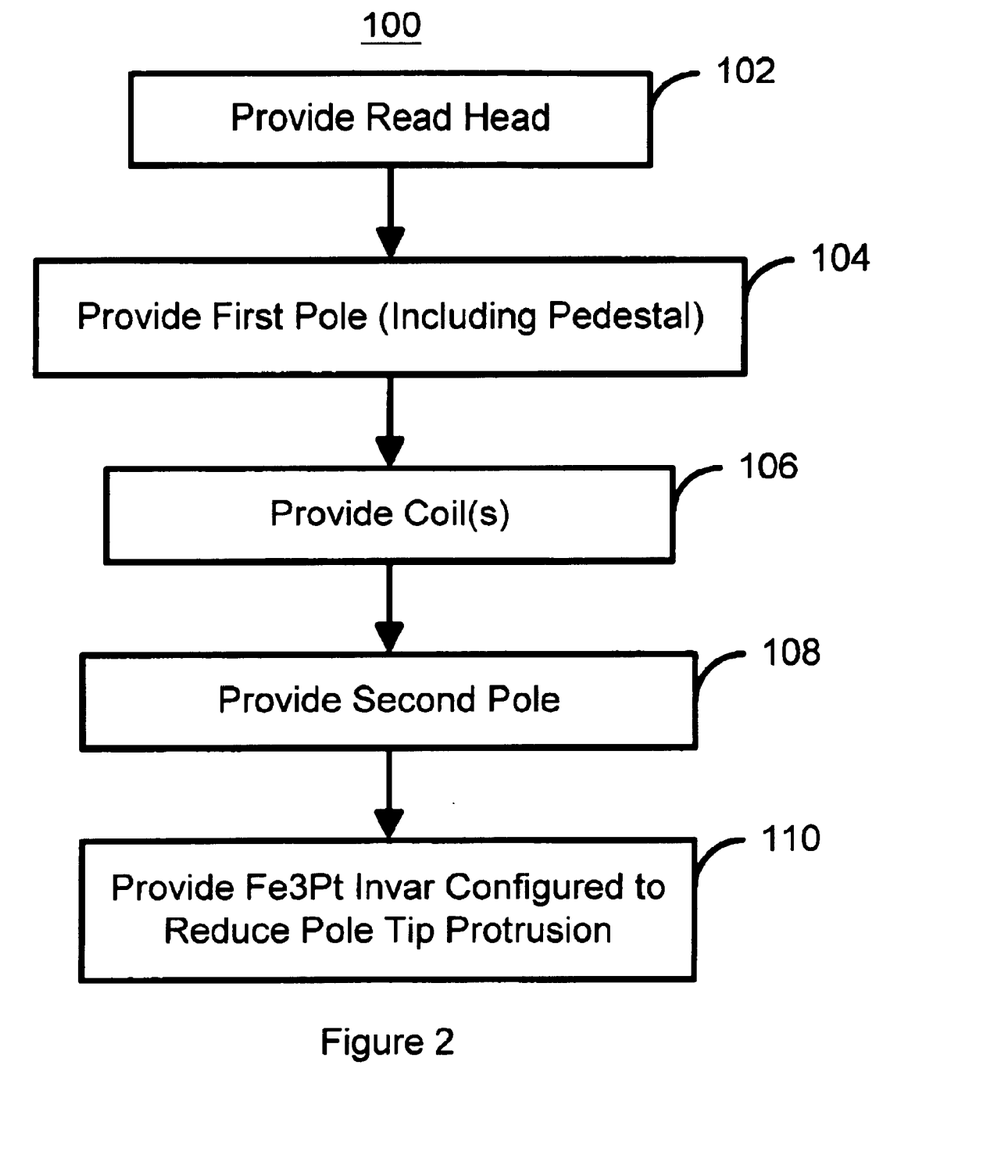
FIG. 2 is a high level flow-chart of one embodiment of a method for providing a recording head in accordance with the present invention having reduced thermal pole tip protrusion.

To more particularly illustrate the method and system in accordance with the present invention, refer now to FIG. 2, depicting a high level flow-chart of one embodiment of a method 100 for providing a recording head in accordance with the present invention having reduced thermal pole tip protrusion. The read head is preferably fabricated first, via step 102. Step 102 includes forming a first shield (S1), forming a read sensor separated from S1 by an insulating gap, and forming a second shield (S2) separated from the read sensor by another insulating gap. Step 102 also preferably includes forming an insulating gap over S2, upon which the write head is formed. The first pole (P1) is provided, via step 104. Step 104 preferably includes forming a pedestal for the first pole in proximity to the air-bearing surface. The coils are provided, via step 106. Step 106 also includes providing insulation for the coils. The second pole (P2) is provided, via step 108. Generally, steps 104 through 108 are performed piecemeal. For example, most of P1 is provided. A layer of insulation for the coil(s) is provided before the pedestal is deposited. After deposition and planarizing of the pedestal, the coils are provided. The coils are then insulated and P2 provided.

$Fe_3Pt$ INVAR is provided, via step 110. The $Fe_3Pt$ INVAR provided in step 110 can be provided in any number of portions of the head. In one embodiment, step 110 provides the $Fe_3Pt$ INVAR over P2 of the write head. In such an embodiment, step 110 is performed after step 108. In another embodiment, the $Fe_3Pt$ INVAR is provided between S2 and P1. In such an embodiment, step 110 is performed prior to step 104. In a third embodiment, the $Fe_3Pt$ INVAR provided in step 110 is provided under S1 of the read head. In such an embodiment, step 110 is performed before step 102. In another embodiment, the $Fe_3Pt$ INVAR provided in step 110 has an aperture in the region of the coil(s). In a fifth embodiment, step 110 provides the $Fe_3Pt$ INVAR around the sides of the poles. In addition, these embodiments could be combined in any number of ways. In all embodiments, the $Fe_3Pt$ INVAR is preferably distant enough from portions of the write head to ensure that the $Fe_3Pt$ INVAR is magnetically decoupled from the coil(s). The $Fe_3Pt$ INVAR is also preferably magnetically decoupled from P1 and P2 of the write head.

The $Fe_3Pt$ INVAR provided in step 110 has a large negative coefficient of thermal expansion. For example, coefficients of thermal expansion of $-30 \times 10^{-6}/K$ have been reported. Moreover, the coefficient of thermal expansion of the $Fe_3Pt$ INVAR is not strongly dependent upon the composition of the $Fe_3Pt$ INVAR. In addition, the large negative coefficient of thermal expansion has been observed for both the disordered and ordered forms of $Fe_3Pt$ INVAR. As a result, the desired coefficient of thermal expansion is can more easily be achieved. For example, in preferred embodiments, the $Fe_3Pt$ INVAR may either be sputtered or plated.

Because the coefficient of thermal expansion of $Fe_3Pt$ INVAR is negative, the $Fe_3Pt$ INVAR contracts upon heating. As a result, the $Fe_3Pt$ INVAR places stress upon the tips of P1 and P2 that tends to reduce or eliminate the thermal expansion of the tips of P1 and P2. Because the magnitude of the coefficient of thermal expansion of the $Fe_3Pt$ INVAR is so large, thinner layers of $Fe_3Pt$ INVAR can be provided in step 110. In one embodiment, the $Fe_3Pt$ INVAR is between one and fifteen micrometers thick. Consequently, by adding relatively small amounts of $Fe_3Pt$ INVAR to the head, the thermal pole tip protrusion may be dramatically reduced or eliminated. Thus, the reliability of the head is improved.

Figure 3:
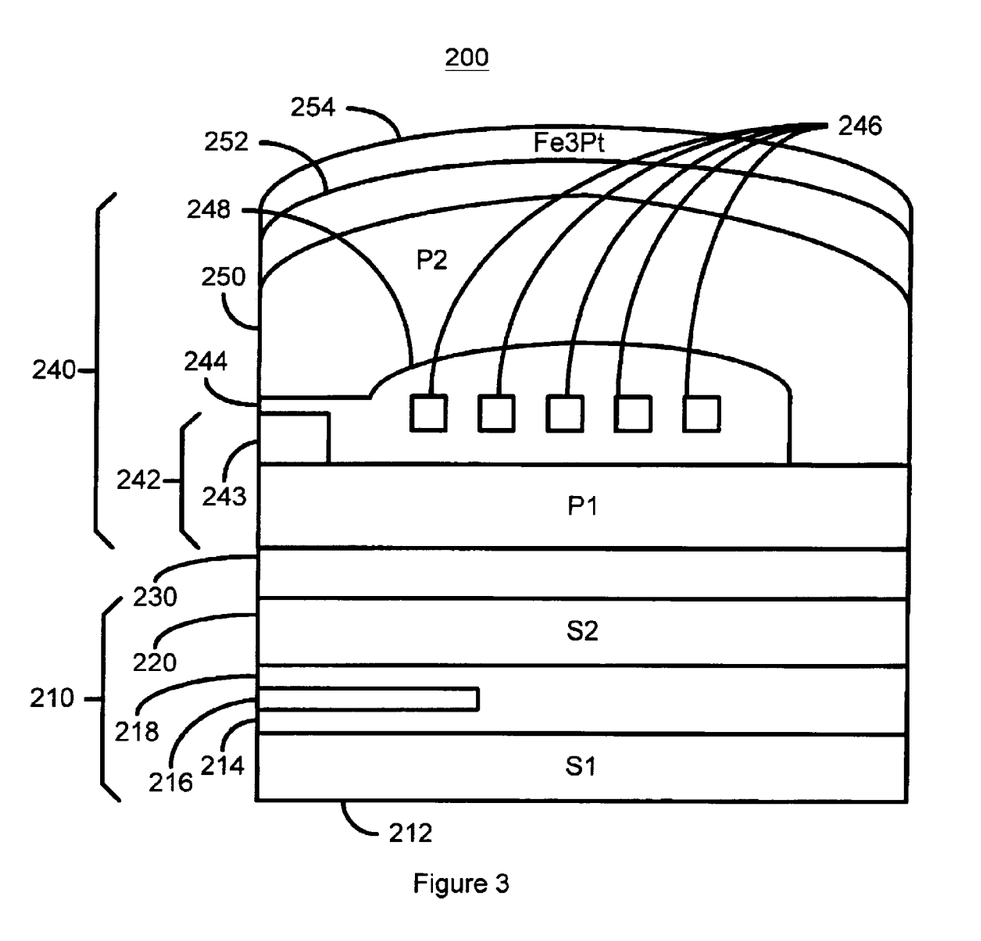
FIG. 3 is a side view of a portion of a first embodiment of a merged head including a write head in accordance with the present invention having reduced thermal pole tip protrusion.

FIG. 3 is a side view of a portion of a first embodiment of a merged head 200 including write head in accordance with the present invention having reduced thermal pole tip protrusion. The merged head 200 includes a read head 210 and a write head 240. The read head 210 includes S1 212, a first gap 214, a read sensor 216, a second gap 218 and S2 220. The S2 220 of the read head 210 is separated from the write head 240 by a gap 230. The write head 240 includes a P1 242 having a pedestal 243, a coil 246 surrounded by insulator 248, and a P2 250. A portion of P2 250 is separated from the pedestal 243 of the P1 242 by a write gap 244. In addition, the merged head 200 includes $Fe_3Pt$ INVAR 254 separated from P2 250 by a gap 252 that is preferably insulating and nonmagnetic. The $Fe_3Pt$ INVAR is thus magnetically decoupled from the coil 246, as well as the poles 242 and 250.

Figure 4:
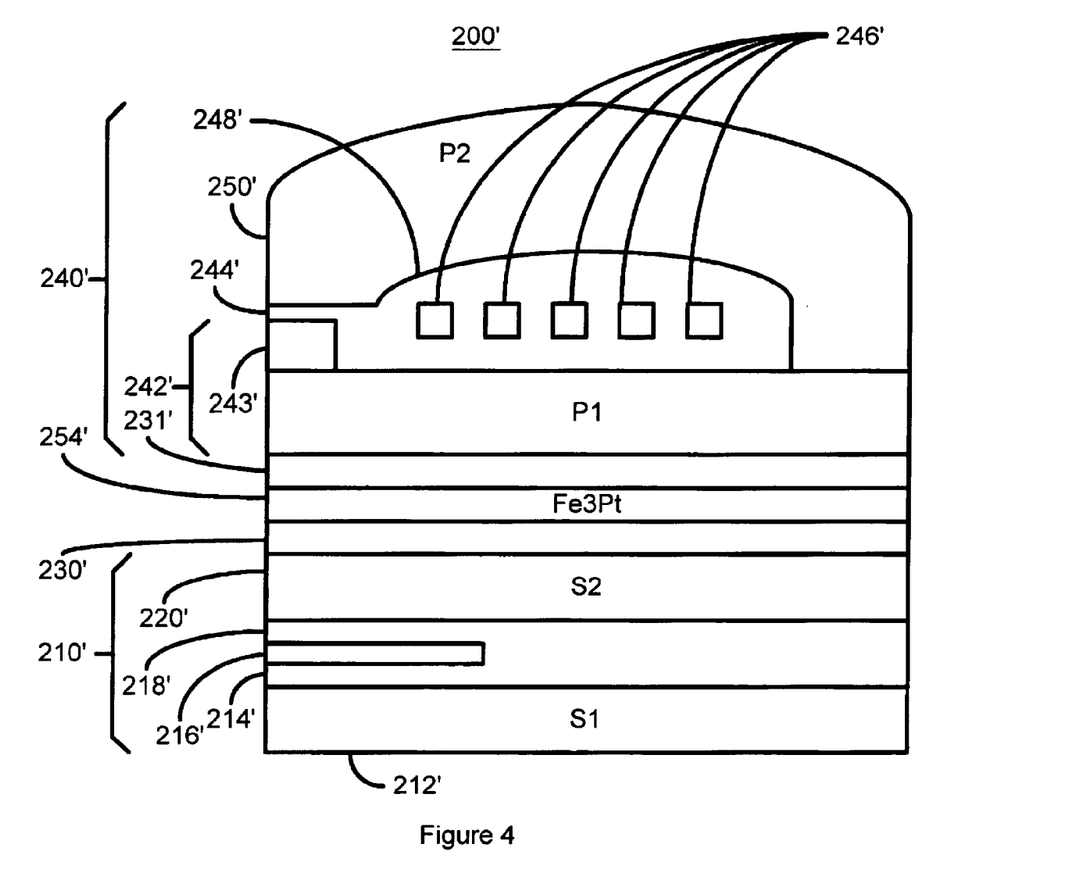
FIG. 4 is a side view of a portion of a second embodiment of a merged head including a write head in accordance with the present invention having reduced thermal pole tip protrusion.

FIG. 4 is a side view of a portion of a second embodiment of a merged head 200' including a write head 240' in accordance with the present invention having reduced thermal pole tip protrusion. The merged head 200' has components which are analogous to the merged head 200 depicted in FIG. 3. These components are numbered similarly. For example, the merged head 200' includes read head 210' and write head 240' corresponding to the read head 210 and write head 240 of FIG. 3. Referring back to FIG. 4, the merged head 200' includes gaps 230' and 231' between the read head 210' and the write head 240'. The Fe₃Pt INVAR 254' resides between the gaps 230' and 231'. Thus, the Fe₃Pt INVAR 254' is between S2 220' and P1 242'. Because it is separated using the gaps 230' and 231, the Fe₃Pt INVAR is magnetically decoupled from the coil 246' as well as the poles 242' and 250'.

Figure 5:
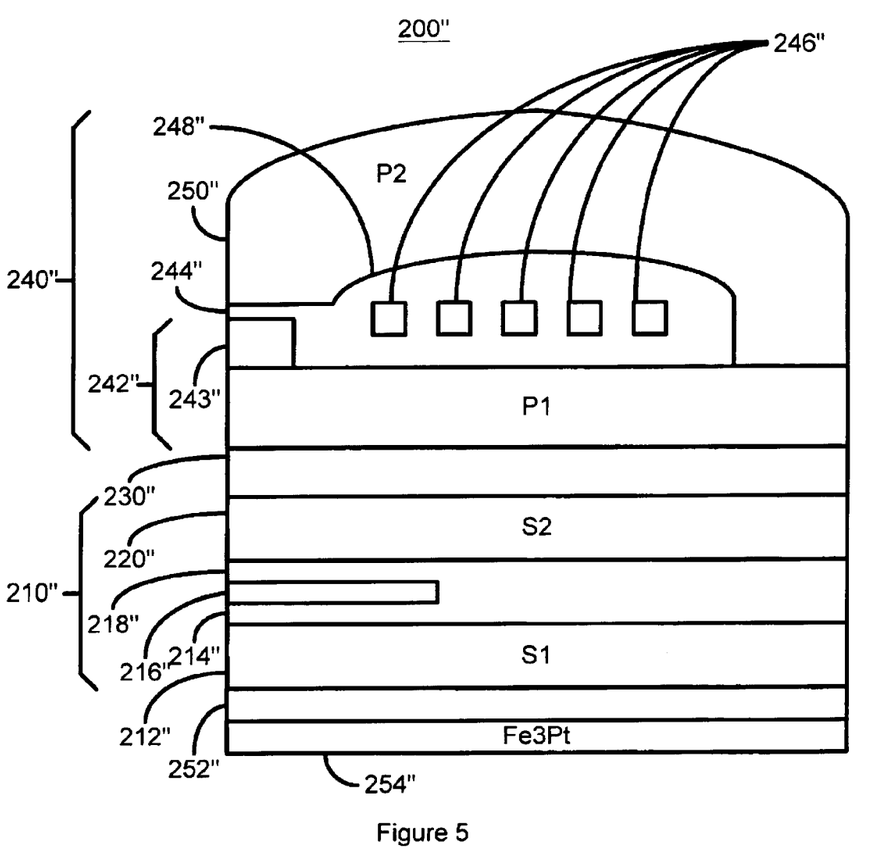
FIG. 5 is a side view of a portion of a third embodiment of a merged head including a write head in accordance with the present invention having reduced thermal pole tip protrusion.

FIG. 5 is a side view of a portion of a third embodiment of a merged head 200" including a write head 240" in accordance with the present invention having reduced thermal pole tip protrusion. The merged head 200" has components which are analogous to the merged head 200 depicted in FIG. 3. These components are numbered similarly. For example, the merged head 200" includes read head 210" and write head 240" corresponding to the read head 210 and write head 240 of FIG. 3. The Fe₃Pt INVAR 254" resides below S1 212" and separated by gap 252". Because it is separated using the gap 252", the Fe₃Pt INVAR 254" is magnetically decoupled from the coil 246" as well as the poles 242" and 250".

Figure 6:
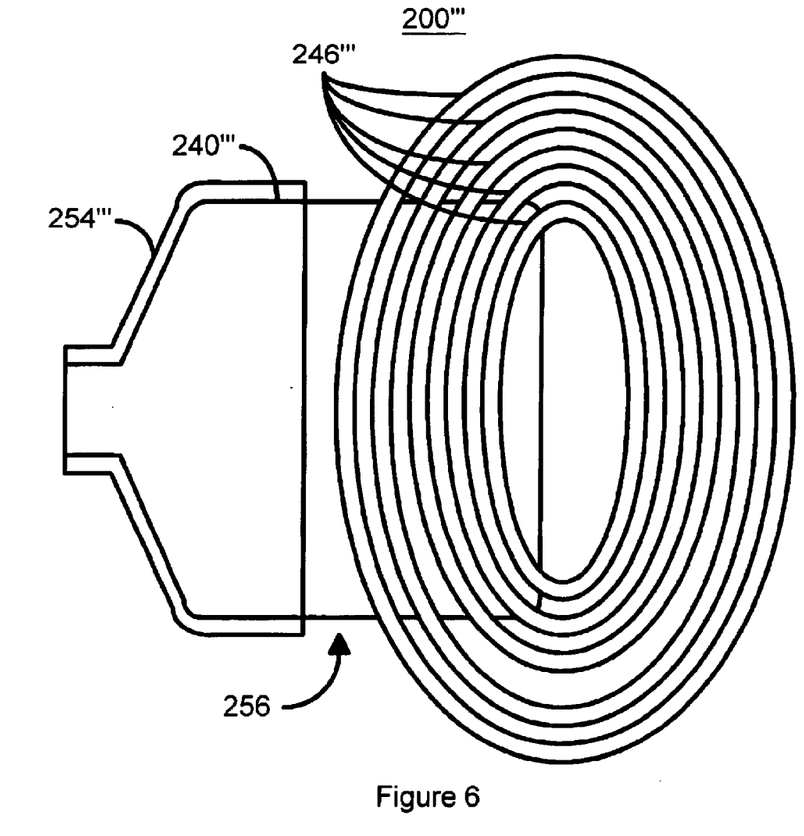
FIG. 6 is a top view of a portion of a fourth embodiment of a merged head including a write head in accordance with the present invention having reduced thermal pole tip protrusion.

FIG. 6 is a top view of a portion of a fourth embodiment of a merged head 200'" including a write head 240'" in accordance with the present invention having reduced thermal pole tip protrusion. FIG. 6 depicts a planar view of the merged head 200'". The merged head 200'" has components which are analogous to the merged head 200 depicted in FIG. 3. These components are numbered similarly. For example, the merged head 200'" includes read head 210'" and write head 240'" corresponding to the read head 210 and write head 240 of FIG. 3. Referring back to FIG. 6, the merged head 200'" includes the Fe₃Pt INVAR 254'" surrounding the poles. The Fe₃Pt INVAR 254'" also includes aperture 256. The aperture 256 covers the region where the coil 246'" resides. Thus, there is less Fe₃Pt INVAR 254'" close to the coils 246'". As a result, there is less chance that the Fe₃Pt INVAR 254'" is magnetically coupled to the coil 246'". The Fe₃Pt INVAR is preferably decoupled from the coil 246'" as well as the poles.

Figure 7:
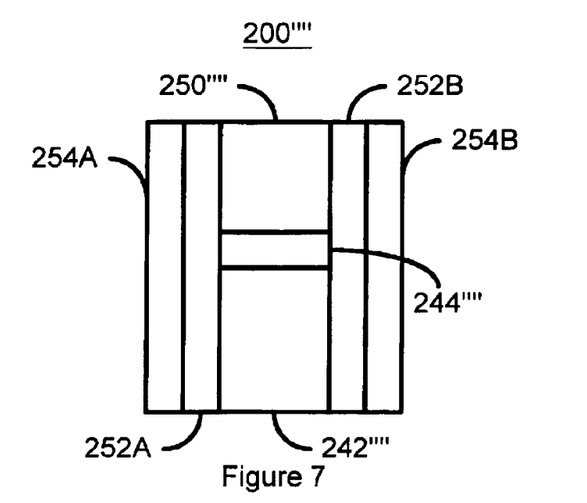
FIG. 7 is a side view of a portion of a fifth embodiment of a merged head including a write head in accordance with the present invention having reduced thermal pole tip protrusion.

FIG. 7 is a side view of a portion of a fifth embodiment of a merged head 200"" including a write head in accordance with the present invention having reduced thermal pole tip protrusion. FIG. 7 depicts the merged head 200"" as viewed from the air-bearing surface. The merged head 200"" has components which are analogous to the merged head 200 depicted in FIG. 3. These components are numbered similarly. For example, the merged head 200"" includes read head 210"" and write head 240"" corresponding to the read head 210 and write head 240 of FIG. 3. Referring back to FIG. 7, the merged head 200"" includes gaps 252A and 252B around the P1 242"" and P2 250"". The Fe₃Pt INVAR 254A and 254B thus resides outside of at least a portion of the poles 242"" and 250"". Because it is separated using the gaps 252A and 252B, the Fe₃Pt INVAR 254A and 245B is magnetically decoupled from the coil 246"" as well as the poles 242"" and 250"".

The Fe₃Pt INVAR 254, 254', 254", 254'", and 254A and 254B used in the merged heads 200, 200', 200", 200'" and 200"", respectively, has the properties described above. Thus, the Fe₃Pt INVAR has a large negative coefficient of thermal expansion that is not strongly dependent upon the composition and state (ordered/disordered) of the Fe₃Pt INVAR. Because the coefficient of thermal expansion of Fe₃Pt INVAR is negative, the Fe₃Pt INVAR contracts upon heating. As a result, the Fe₃Pt INVAR places stress upon the tips of P1 and P2 that tends to reduce or eliminate the thermal expansion of the tips of P1 and P2. Because the magnitude of the coefficient of thermal expansion of the Fe₃Pt INVAR is so large, thinner layers of Fe₃Pt INVAR can be provided in step 110. In one embodiment, the Fe₃Pt INVAR is between one and fifteen micrometers thick. Consequently, by adding relatively small amounts of Fe₃Pt INVAR to the head, the thermal pole tip protrusion may be dramatically reduced or eliminated. Because the coefficient of thermal expansion is not strongly dependent on the composition and state of the Fe₃Pt, the desired coefficient of thermal expansion can more easily be achieved during fabrication. Thus, the reliability of the head is easily improved.

A method and system has been disclosed for providing an improved recording head having reduced or no thermal pole tip protrusion. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A recording head comprising:
    a first pole;
    a second pole;
    a write gap separating a first portion of the first pole from a second portion of the second pole, the first portion of the first pole and the second portion of the second pole for writing to a medium;
    at least one coil having a plurality of turns between a third portion of the first pole and a fourth portion of the second pole; and
    an Fe₃Pt alloy in proximity to the first pole and the second pole, the Fe₃Pt alloy being configured to counteract expansion of the first portion of the first pole and the second portion of the second pole.

2. The recording head of claim 1 wherein the Fe₃Pt alloy is magnetically decoupled from the at least one coil.

3. The recording head of claim 1 wherein the second pole is above the first pole and wherein the Fe₃Pt alloy is above the second pole, and wherein the second pole is between the Fe₃Pt alloy and the at least one coil.

4. The recording head of claim 3 further comprising:
    an insulating layer between the Fe₃Pt alloy and the second pole.

5. The recording head of claim 1 wherein the recording head is part of a merged head including a read head.

6. The recording head of claim 5 wherein the read head is below the write head, wherein the read head includes a first shield and a second shield, wherein the first pole is between the second shield and the at least one coil, and wherein the Fe₃Pt alloy is located below the first shield.

7. The recording head of claim 5 wherein the read head is below the write head, wherein the read head includes a first shield and a second shield, wherein the first pole is between the second shield and the at least one coil, and wherein the Fe₃Pt alloy is located between the second shield and the first pole.

8. The recording head of claim 1 wherein the Fe₃Pt alloy substantially surrounds the first pole and the second pole.

9. The recording head of claim 8 wherein the Fe₃Pt alloy has an aperture therein, the aperture being above the at least one coil.

10. The recording head of claim 1 wherein the Fe₃Pt alloy has a thickness of between one and fifteen micrometers.

11. The recording head of claim 1 wherein the recording head has a right edge and wherein the Fe₃Pt alloy is located outside of the right edge of the recording head.

12. The recording head of claim 1 wherein the recording head has a left edge and wherein the $Fe_3Pt$ alloy is located outside of the left edge of the recording head.

13. A method for providing a recording head comprising the steps of:
    (a) providing a first pole;
    (b) providing a second pole;
    (c) providing a write gap separating a first portion of the first pole from a second portion of the second pole, the first portion of the first pole and the second portion of the second pole for writing to a medium;
    (d) providing at least one coil having a plurality of turns between a third portion of the first pole and a fourth portion of the second pole; and
    (e) providing an $Fe_3Pt$ alloy in proximity to the first pole and the second pole, the $Fe_3Pt$ alloy being configured to counteract expansion of the first portion of the first pole and the second portion of the second pole.

14. The method of claim 13 wherein the step of providing the $Fe_3Pt$ alloy (e) further includes the step of:
    (e1) ensuring that the $Fe_3Pt$ alloy is magnetically decoupled from the at least one coil.

15. The method of claim 13 wherein the second pole is above the first pole and wherein the $Fe_3Pt$ alloy is above the second pole, and wherein the second pole is between the $Fe_3Pt$ alloy and the at least one coil.

16. The method of claim 15 further comprising the step of:
    (f) an insulating layer between the $Fe_3Pt$ alloy and the second pole.

17. The method of claim 13 wherein the write head is part of a merged head including a read head.

18. The method of claim 17 wherein the read head is below the write head, wherein the read head includes a first shield and a second shield, wherein the first pole is between the second shield and the at least one coil, and wherein the step of providing the $Fe_3Pt$ alloy (e) further includes the step of:
    (e1) locating $Fe_3Pt$ alloy below the first shield.

19. The method of claim 17 wherein the read head is below the write head, wherein the read head includes a first shield and a second shield, wherein the first pole is between the second shield and the at least one coil, and wherein the step of providing the $Fe_3Pt$ alloy (e) further includes the step of:
    (e1) providing the $Fe_3Pt$ alloy between the second shield and the first pole.

20. The method of claim 13 wherein the step of providing the $Fe_3Pt$ alloy further includes the step of:
    (e1) ensuring that the $Fe_3Pt$ alloy substantially surrounds the first pole and the second pole.

21. The method of claim 20 wherein the $Fe_3Pt$ alloy has an aperture therein, the aperture being above the at least one coil.

22. The method of claim 13 wherein the step of providing the $Fe_3Pt$ alloy (e) further includes the step of:
    (e1) providing $Fe_3Pt$ alloy with a thickness of between one and fifteen micrometers.

23. The method of claim 13 wherein the recording head has a right edge and wherein the step of providing the $Fe_3Pt$ alloy (e) further includes the step of:
    (e1) locating $Fe_3Pt$ alloy outside of the right edge of the recording head.

24. The method of claim 13 wherein the recording head has a left edge and wherein the step of providing the $Fe_3Pt$ alloy (e) further includes the step of:
    (e1) locating $Fe_3Pt$ alloy outside of the left edge of the recording head.

25. A recording head comprising:
    a first pole;
    a second pole;
    a write gap separating a first portion of the first pole from a second portion of the second pole;
    at least one coil having a plurality of turns and residing between a third portion of the first pole and a fourth portion of the second pole; and
    an $Fe_3Pt$ alloy structurally coupled with the first portion of the first pole and the second portion of the second pole.

26. The recording head of claim 25 wherein the second pole is between the $Fe_3Pt$ alloy and the first pole.

27. The recording head of claim 25 further comprising:
    a read head including a first shield and a second shield and a read element between the first shield and the second shield;
    wherein the first pole is between the second shield and the at least one coil, and wherein the first shield is between the $Fe_3Pt$ alloy and the first pole.

28. The recording head of claim 25 further comprising:
    a read head including a first shield and a second shield and a read element between the first shield and the second shield;
    wherein the first pole is between the second shield and the at least one coil, and wherein the $Fe_3Pt$ alloy is between the second shield and the first pole.

29. The recording head of claim 25 wherein the $Fe_3Pt$ alloy substantially surrounds the first pole and the second pole.

30. The recording head of claim 29 wherein the $Fe_3Pt$ alloy has an aperture therein, the aperture being aligned with the at least one coil.

31. The recording head of claim 25 wherein the recording head has a right edge and wherein the $Fe_3Pt$ alloy is located outside of the right edge.

32. The recording head of claim 25 wherein the recording head has a left edge and wherein the $Fe_3Pt$ alloy is located outside of the left edge of the recording head.

* * * * *